US006971582B2

(12) United States Patent
Kim

(10) Patent No.: US 6,971,582 B2
(45) Date of Patent: Dec. 6, 2005

(54) MEMORY CARD, DIGITAL DEVICE, AND METHOD OF DATA INTERFACING BETWEEN MEMORY CARD AND DIGITAL DEVICE

(75) Inventor: Jin-soo Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 10/191,437

(22) Filed: Jul. 10, 2002

(65) Prior Publication Data

US 2003/0075609 A1   Apr. 24, 2003

(30) Foreign Application Priority Data

Oct. 19, 2001   (KR) ................. 2001-64548

(51) Int. Cl.[7] ........................................... G06K 19/06
(52) U.S. Cl. ............... 235/492; 235/487; 235/451; 713/501; 713/600
(58) Field of Search ................... 235/492, 487, 235/380, 451; 713/501, 600; 365/189.03, 365/189.01; 375/354, 219

(56) References Cited

U.S. PATENT DOCUMENTS

| 4,813,014 | A | * | 3/1989 | DeBell ..................... 365/45 |
| 4,998,279 | A | * | 3/1991 | Weiss ..................... 340/5.52 |
| 5,001,731 | A | * | 3/1991 | Atwell et al. ............. 375/356 |
| 5,199,107 | A | * | 3/1993 | Ozawa ..................... 713/400 |
| 5,361,228 | A | * | 11/1994 | Adachi et al. ........... 365/189.03 |
| 5,619,529 | A | * | 4/1997 | Fujioka ..................... 375/219 |
| 5,712,881 | A | * | 1/1998 | Iijima ..................... 375/354 |
| 5,740,112 | A | * | 4/1998 | Tanaka et al. ........... 365/189.01 |
| 6,088,741 | A | * | 7/2000 | Murata ..................... 710/20 |
| 6,118,319 | A | * | 9/2000 | Yamada et al. ............. 327/291 |
| 6,145,946 | A | * | 11/2000 | Gauthier et al. ............. 347/5 |
| 6,223,990 | B1 | * | 5/2001 | Kamei ..................... 235/492 |
| 6,299,455 | B1 | * | 10/2001 | Dong ..................... 439/59 |
| 2002/0060249 | A1 | * | 5/2002 | Perron ..................... 235/492 |
| 2002/0083192 | A1 | * | 6/2002 | Alisuag ..................... 709/237 |
| 2002/0110209 | A1 | * | 8/2002 | Inkai ..................... 375/354 |
| 2002/0113980 | A1 | * | 8/2002 | Reed ..................... 358/1.6 |
| 2003/0092377 | A1 | * | 5/2003 | Hill ..................... 455/3.06 |
| 2004/0128460 | A1 | * | 7/2004 | Donnelly et al. ........... 711/167 |

FOREIGN PATENT DOCUMENTS

| JP | 10-187275 | | 7/1998 |
| JP | 200268139 A | * | 9/2000 |
| JP | 2002-183692 | | 6/2002 |

* cited by examiner

Primary Examiner—Jared J. Fureman
Assistant Examiner—Allyson N Trail
(74) Attorney, Agent, or Firm—Staas & Halsey LLP

(57) ABSTRACT

A memory card includes improved data transmission speed. A digital device is capable of data interfacing with memory card for a high speed, and a method for a high-speed data interface between the memory card and the digital device. The memory card includes a memory unit storing data and an oscillator generating a first clock signal. The memory card includes an interface transmitting the data synchronously read with the first clock signal to host connected therewith and receiving from the host a recording data synchronously transmitted from the host with a second clock signal.

12 Claims, 7 Drawing Sheets

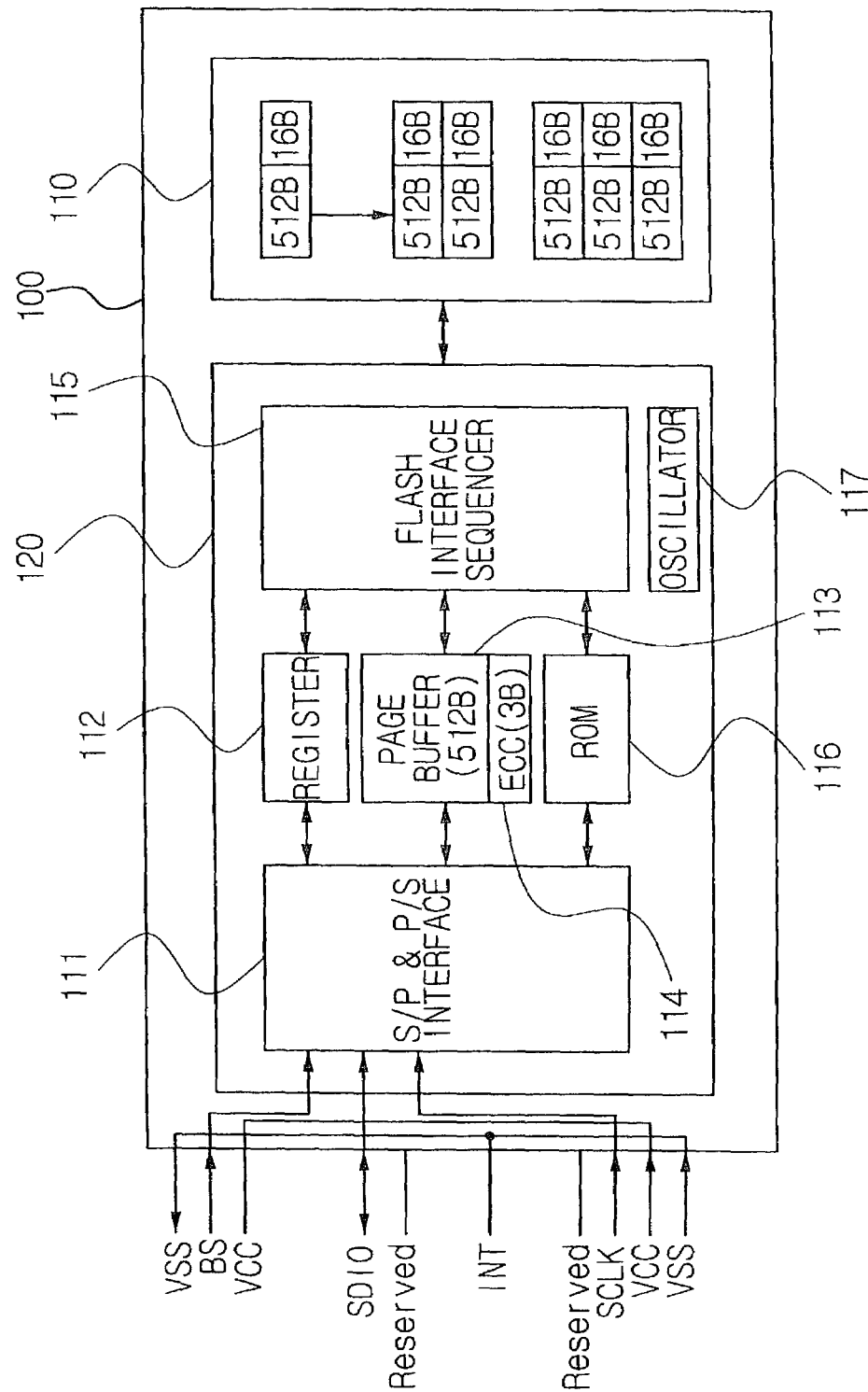

PRIOR ART

FIG. 3A  BS —BS0—/ BS1 \\— BS2 —/ BS3 \\— BS0

FIG. 3B  SDIO ——X TPC X BUSY \\ RDY X——————X——

FIG. 3C  SCLK ____||||||||||||||||||||||||||||||||||||||||||||||||||||||____

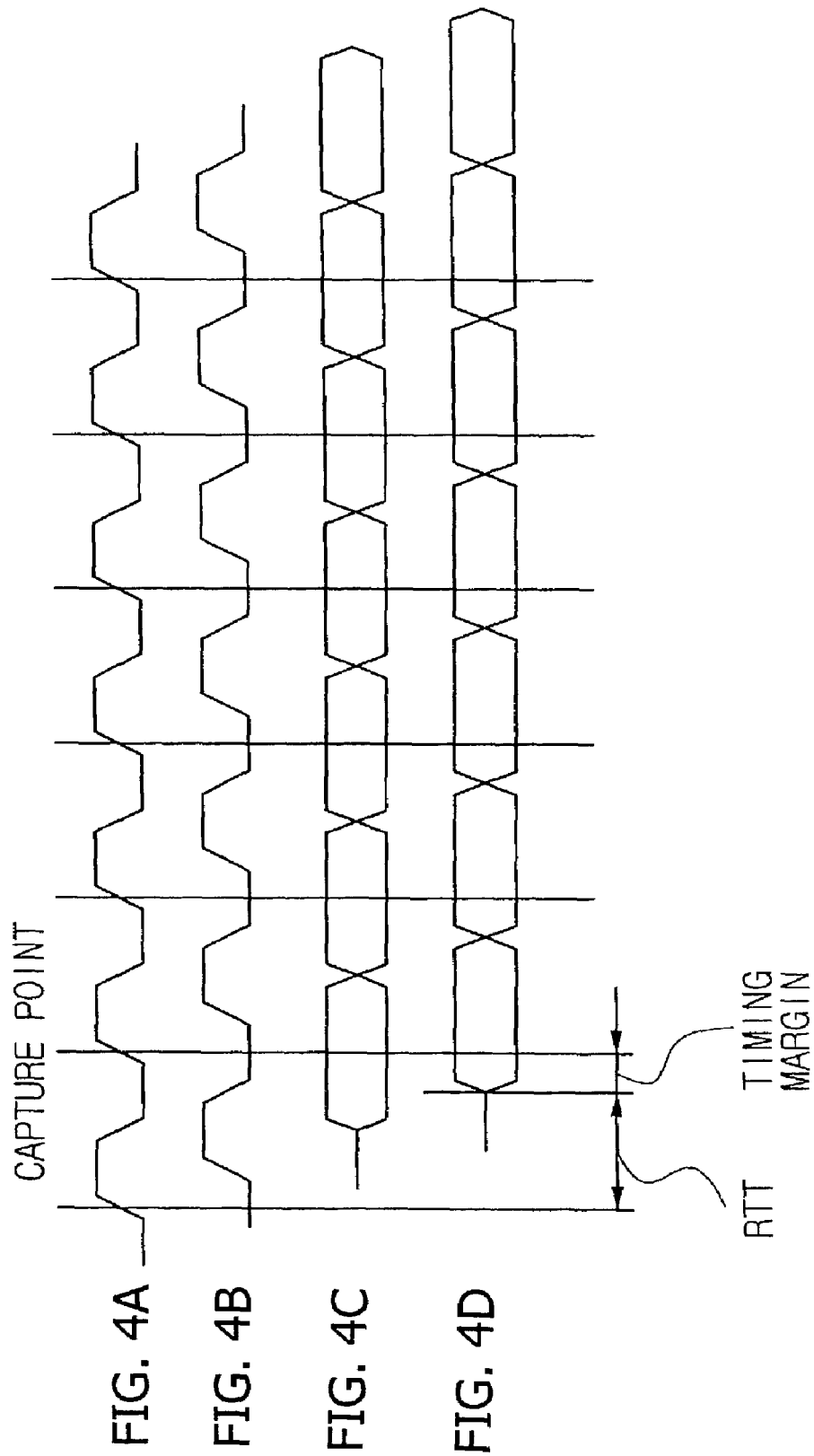

MEMORY CARD, DIGITAL DEVICE, AND METHOD OF DATA INTERFACING BETWEEN MEMORY CARD AND DIGITAL DEVICE

CROSS-REFERENCE TO RELATED APPLICATIONS

This application claims the benefit of Korean Application No. 2001-64548, filed Oct. 19, 2001, in the Korean Patent Office, the disclosure of which is incorporated herein by reference.

BACKGROUND OF THE INVENTION

1. Field of the Invention

The present invention relates to a memory card and a digital device using the memory card, and more particularly, to a memory card for improving a data transmission speed, a digital device using the memory card, and a method of data interfacing between two apparatuses.

2. Description of the Related Art

Some examples of recording media used as a secondary memory of a digital device include a punch card formed by puncturing a paper card, a magnetic disk such as a floppy disk and a hard disk, an optical disk such as a CD and DVD, and a memory card such as an SMC (Smart Media Card) and MMC (Multimedia Memory Card).

Some of the above recording media have been modified and used in various fields. A memory card based on a flash memory recently developed is very popular due to the card's high capability of data transmission.

On the other hand, a Memory Stick (a registered trademark in Japan to Sony Corporation) has been introduced as a new type of memory card. The memory stick does not include an electrode unlike the SMC, thus data stability is high. In addition, the memory stick has an advantage of low cost because the memory stick does not have a built-in microprocessor in the memory card.

FIG. 1 is a view showing the appearance of a conventional memory stick 100. The memory stick 100 has a small-sized socket 20 to contact with an apparatus. Yet, the length of a body 40 of the memory stick 100 is rather long because, although a data transmission method of the memory stick 100 is a serial type and a number of required signal lines is few, the memory stick 110 is constructed to have a required circuit of a predetermined size in the body 40.

FIG. 2 is a block diagram showing the inner structure of the conventional memory stick 100. The memory stick 100 has a flash memory unit 110 for storing data, an interface 120 for recording the data transmitted from a host (not shown) into the memory unit 110 or transmitting the data recorded in the memory unit 110 to the host after reading the data. The interface 120 includes S (serial)/P (parallel) and P (parallel)/S (serial) interface 111, a register 112, a page buffer 113, an ECC (Error Correction Code) 114, a flash interface sequencer 115, a ROM 116, and an oscillator 117.

The S/P and P/S interface 111 is connected to the interface of the host and converts serial data transmitted from the host into parallel data. Furthermore, the S/P and P/S interface 111 converts the parallel data generated in the memory stick 110 into serial data, and transmits the serial data to the host. The register 112 includes a command register (not shown), a write register (not shown), and read register (not shown). The page buffer 113 temporally stores input/output data. The ECC 114 performs an error correction and generates an error correction code with respect to the temporally stored input/output data of the page buffer 113.

The flash interface sequencer 115 records the input/output data stored in the page buffer 113 to the memory 110, or reads the recorded data from the flash memory 110 and outputs the data to the page buffer 113 in response to a command recorded in the register 112. The ROM 116 stores version information and attribution information of the memory stick 100. The oscillator 117 generates a clock signal for a signal process timing in the memory stick 100.

The memory stick 100 has ten lines for serial interfacing with the host. These lines are a data line SD10 to transmit the data, a clock line SCLK to transmit a clock signal, a state line BS to transmit a state signal, an interrupt line INT, two earth lines VSS, two electric power lines VCC, and two reserved lines. Among the above ten lines, the signals especially related to the interface are the clock line SCLK, the state line BS, and the data line SD10.

Referring to FIG. 3, an input/output operation of the memory stick 100 will be described hereinafter. When the data is output, the state line BS and the data line SD10 in a first state BS0 of an initial state are respectively low levels. In addition, in a second state BS1, the clock line SCLK and the state line BS are converted to a high level where a command TPC (Transfer Protocol Command) to operate the memory stick 100 is transmitted from the host. Once the transmission of the TPC is completed, a level of the state line BS is converted from high to low and the state line BS becomes a third state BS2.

The interface 120 performs the TPC command in the third state BS2. When the TPC is a data read command, the data is transmitted from the memory 110 to the page buffer 113. Furthermore, when the data transmission from the flash memory 110 to the page buffer 113 is completed, the memory stick 100 transmits a ready signal, which means that the data is ready to be transmitted to the host through the data line SD10. Then, the host converts the level of the state line BS from low to high. In a fourth state BS3 converted as above, the memory stick 100 outputs the data in the page buffer 113 to the host through the data line. When the data transmission from the memory stick 110 to the host is completed, the host stops the transmission of the clock signal and returns to the initial state by converting the level of the state line from high to low.

In the meantime, when the TPC is a write command, in a third state BS3 of the state line BS, in other words, in a section of a low level, the host transmits a recording data to the memory stick 100. Moreover, the memory stick 100 stores the transmitted data into the page buffer 113. When the data transmission is completed, the host converts the level of the state line BS from low to high. In the fourth state BS4, the level of the state line BS is converted to high, the memory stick 100 records the data stored in the page buffer 113 into the memory 110, and transmits a busy signal to the host.

Subsequently, when the data stored in the page buffer 113 is completely recorded into the memory 110, the memory stick 100 transmits a recording completion signal to the host. Then, the host receives the recording completion signal from the memory stick 100, determines that the transmitted data is completely recorded, and stops the transmission of the clock signal. Moreover, the host converts the signal level of the state line BS from high to low, and returns to the initial state.

The clock signal to operate the memory stick 100 is provided from the host. In other words, the clock signal provides a timing reference to the host to input and output the data to the memory stick 100, and the host also captures the data on the basis of the clock signal. Accordingly, the host has an RTT (round trip time) from the time of providing the clock signal to the time of stopping the clock signal.

Furthermore, a highest speed for the operation of the memory stick 100 is determined as 20 MHz considering that the electric power is unstable in a mobile apparatus. The operation speed has a transmission rate of about 2 Mbytes/s as a serial transmission.

However, the capability of the conventional memory stick 100 is very low considering that the data transmission rate of the NAND-type flash memory currently available is 20 M Cycle/s and the data is transmitted in a parallel state.

Moreover, the round trip data transmission should be completed in one clock SCLK, making it difficult to improve the speed of the operation clock SCLK, and to store and read a moving image, multi-media data, and a still image of a vast volume. Thus, obstacles exist to perform a high-speed operation. For instance, the still image having over 400 million pixels cannot be stored in a short time with the current memory stick operating at 20 MHz, thus the speed a digital camera may photograph consecutive images is limited. Furthermore, the moving image recorded in the memory stick 100 cannot be reproduced completely. In addition, electric power is supplied as much as the time for the data transmission, thus, more battery needs to be consumed than in a case of high-speed data transmission.

Also, as illustrated in FIG. 4, there is a slight delay between a clock signal 'a' output from the host and a clock signal 'b' transmitted to the interface of the memory stick 100. Additionally, a delay exists between data output 'c' in the memory stick 100 and a data capture 'd' in the host according to the clock signals 'a' and 'b'. At this time, a real capture time (a capture point) in the host has a timing margin, as shown in FIG. 4. The timing margin is also a factor limiting the speed of the operation of the memory stick 100. Because the memory stick 100 has a capture point through a socket, an up/down scope of the signal is distorted and, thus, a time delay occurs.

SUMMARY OF THE INVENTION

The present invention has been made to overcome the above-mentioned problems of the related art. Accordingly, it is the object of the present invention to provide a memory card with improved data transmission speed, a digital device capable of data interfacing with memory card for a high speed, and a method of a high-speed data interfacing between the memory card and the digital device.

To achieve the above and other objects, the present invention may be accomplished by providing a memory card, including: a memory unit storing data; an oscillator generating a first clock signal; and an interface transmitting the data synchronously read with the first clock signal to a host connected therewith, and receiving from the host recording data synchronously transmitted from the host with a second clock signal. The memory unit is either a NAND-type flash memory or a NOR-type flash memory.

The interface including: a first flip-flop outputting the data which is synchronously read with the first clock signal; and a second flip-flop receiving from the host the recording data synchronously transmitted with the second clock signal.

Furthermore, the interface includes: a clock line, commonly connected to each clock terminal of the first and the second flip-flops, receiving the second clock signal; and a first switching unit switching the first clock signal to the clock line according to an input/output of the data.

To achieve the above and other objects, the present invention may be accomplished by the interface further including: a single data line, commonly connected to an output terminal of the first flip-flop and an input terminal of the second flip-flop, to interface the data with the host; and a second switching unit disposed between the output terminal of the first flip-flop and the data line, preventing the data transmitted from the interface from being input to the host. Here, each of the first and the second switching units is a tri-state buffer.

In the meantime, the interface includes: a memory having information with regard to an existence of a function to transmit the data synchronously read with the first clock signal from the memory unit, and enables the function when an enable command is transmitted from the host, wherein the enable command is generated when the function is determined to be stored in the memory.

To achieve the above and other objects, the present invention may be accomplished by providing a digital device with a memory card, including: an interface receiving read data synchronously transmitted from the memory card with a first clock signal generated from the memory card; and an oscillator generating a second clock signal, wherein the interface synchronously transmits recording data to the memory card with the second clock signal generated by the oscillator.

To achieve the above and other objects, the present invention may be accomplished by providing the interface including: a first flip-flop receiving the read data synchronously transmitted with the first clock signal; and a second flip-flop synchronously transmitting the recording data with the second clock signal to the memory card.

To achieve the above and other objects, the present invention may be accomplished by providing the interface including: a clock line, commonly connected with each clock terminal of the first and the second flip-flops, receiving the second clock signal; and a first switching unit switching the first clock signal to the clock line according to an input/output of the data.

Furthermore, the interface further includes: a single data line, commonly connected with an output terminal of the first flip-flop and an input terminal of the second flip-flop, interfacing the data with a host; and a second switching unit disposed between the output terminal of the first flip-flop and the data line, preventing the recording data from being input. Here, each of the first and the second switching units is tri-state buffer. A control unit transmits an enable command to activate a function of transmitting the read data to the memory card, wherein the control unit detects that the function is stored in the memory card.

To achieve the above and other objects, the present invention may be accomplished by providing a method of data interfacing between a memory card and a digital device, including: synchronously transmitting a data read command with a second clock signal from a host to the memory card; synchronously receiving the data read command with the second clock signal; reading a data stored in the memory card according to the data read command transmitted; transmitting the data synchronously read with a first clock signal from the memory card to the host; and receiving the synchronously read data transmitted from the memory card by the host.

In the meantime, the method further includes: detecting an existence of a function in the memory card to transmit the data synchronously read with the first clock signal; and transmitting an enable command to the memory card when the function is detected to exist in the memory card prior to transmitting the data read command from the host to the memory card.

Moreover, the method further includes transmitting a signal from the host to the memory card to request synchronization with the first clock signal prior to transmitting the data synchronously read with the first clock signal.

In addition, the method further includes stopping the synchronization of the data read command with the second clock signal when the host receives the signal to request the synchronization with the first clock signal and prior to receiving the data synchronously transmitted with the first clock signal.

According to the memory card, the digital device, and the method of data interfacing between the memory card and the digital device, the data transmission speed between the memory card and the digital device can be improved, thus an application range of the digital device is expanded.

To achieve the above and other objects, the present invention may be accomplished by providing a method of a digital device with a memory card to store data, including: generating a first clock signal from a side transmitting the data between the digital device and the memory card; synchronously transmitting the data with the first clock signal to a host connected to the digital device; and synchronously receiving from the host recording data with a second clock signal.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above-mentioned object and the feature of the present invention will be more apparent by describing the preferred embodiment of the present invention by referring to the appended drawings, in which:

FIG. 2 is a block diagram showing an inner structure of the memory stick of FIG. 1;

FIGS. 3A to 3C are timing diagrams describing an operation of the memory stick of FIG. 1;

FIGS. 4A to 4D are timing diagrams of the memory stick of FIG. 1;

DETAILED DESCRIPTION OF THE PREFERRED EMBODIMENTS

Figure 1:
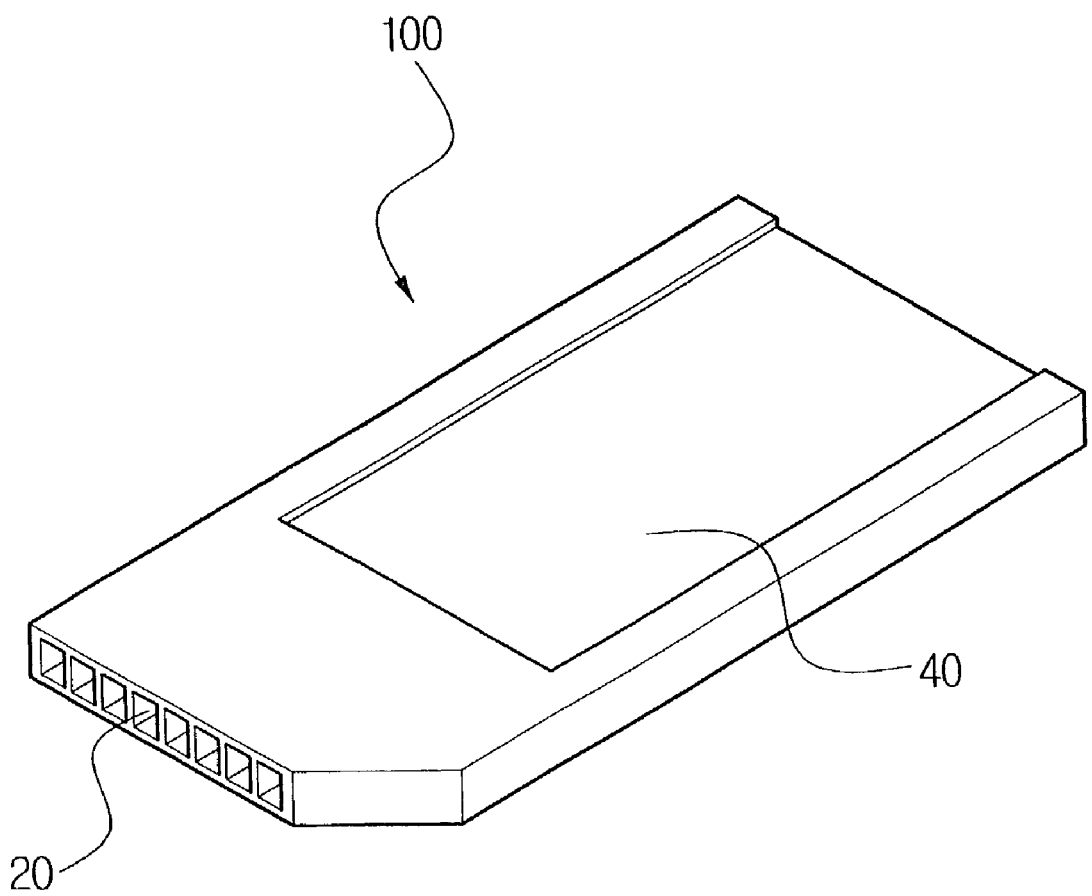
FIG. 1 is a perspective view showing a memory stick.

The present invention will be described in more detail with reference to the accompanying drawings.

A memory card, according to an embodiment of the present invention, has a similar inner structure as the memory stick 100 of FIG. 2, thus, a detailed description of the inner structure of the memory stick 100 will be omitted. Yet, as the present invention has an improved data transmission speed through modified interface structure from a conventional interface structure and a NAND-type flash memory, the interface structure will be mainly described. In addition, like reference numerals shown in FIG. 2 will be used to describe like parts of the present invention.

Figure 5:
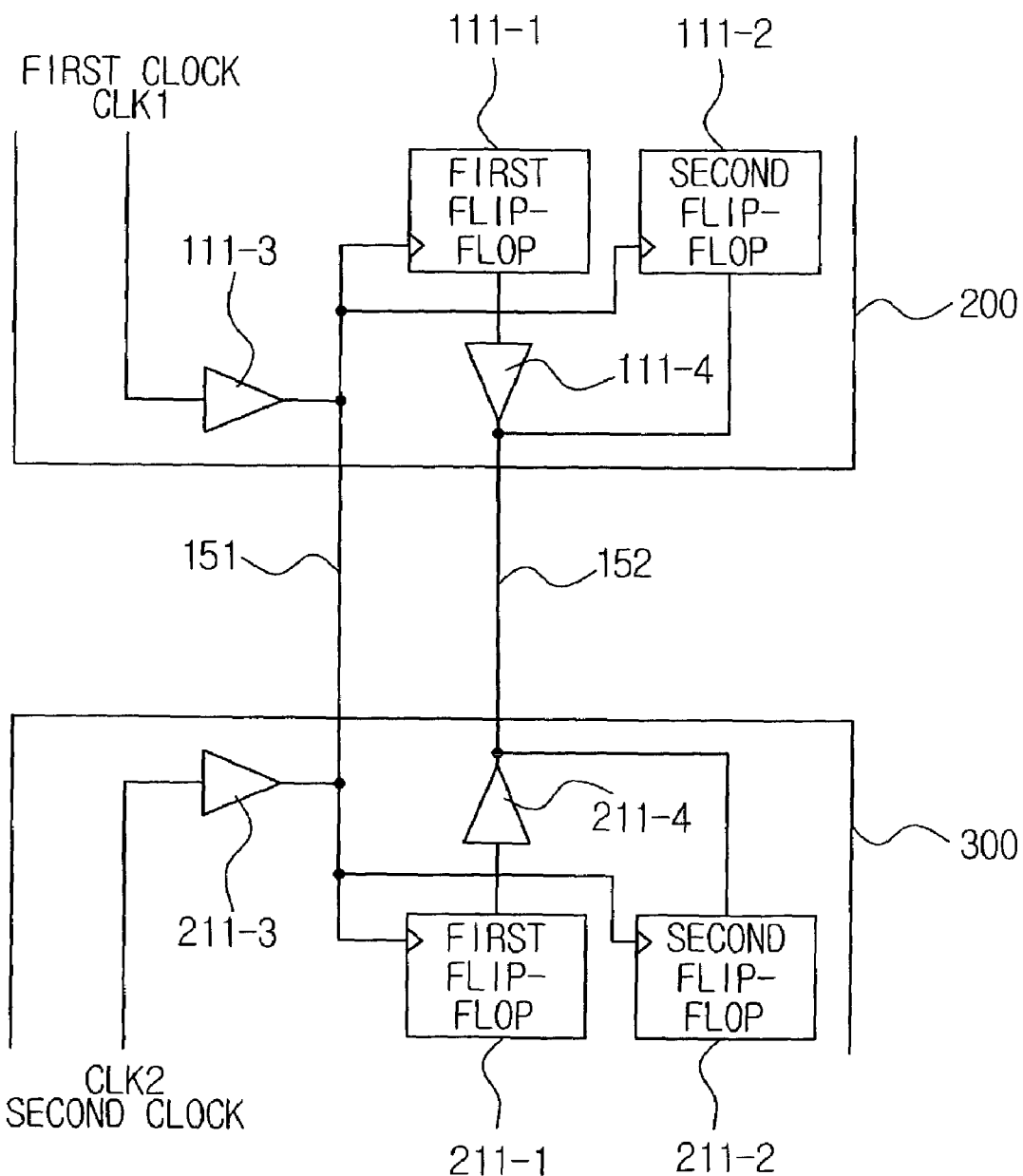
FIG. 5 is a block diagram showing a connection of an interface of a memory card and a digital device according to an embodiment of the present invention.

FIG. 5 is a block diagram schematically showing a connection of an interface of a memory card and a digital device according to the present invention. A memory card 200 includes a first flip-flop 111-1 to output data in a serial transmission, and a second flip-flop 111-2 to input the data. Furthermore, a first tri-state buffer 111-3 is disposed in order to switch a first clock signal CLK1 to a clock line 151 in accordance with the input/output of the data. Moreover, the clock line 151 is a transmission path of a second clock signal CLK2 generated by a host 300 and is commonly connected with clock terminals of the first and the second flip-flops 111-1, 111-2. In addition, a data line 152 is commonly connected with an output terminal of the first flip-flop 111-1 and an input terminal of the second flip-flop 111-2. A second tri-state buffer 111-4 is disposed between the output terminal of the first flip-flop 111-1 and the data line 152 to prevent the data transmitted from the host 300 from being input.

The host 300 includes a first flip-flop 211-1 to output the data in a serial transmission and a second flip-flop 211-2 to input the data from the memory card 200. Additionally, the clock line 151, as a transmission path for the second clock signal CLK2 generated in the host 300, is commonly connected with each clock terminal of the first and the second flip-flops 211-1, 211-2. Furthermore, a first tri-state buffer 211-3 is disposed to switch the second clock signal CLK2 to the clock line 151 according to the input/output of the data. The data line 152, as a transmission path of the data, is commonly connected with the output terminal of the first flip-flop 211-1 and the input terminal of the second flip-flop 211-2. A second tri-state buffer 211-4 is disposed between the output terminal of the first flip-flop 211-1 and the data line 152 to prevent the data transmitted from the memory card 200 from being input to the host 300.

The memory card 200 and the host 300 are connected through the clock line 151 and the data line 152, and the data is output through the first flip-flops 111-1, 211-1 of the memory card 200 and the host 300, respectively, and input through the second flip-flops 111-2, 211-2 of the memory card 200 and the host 300, respectively. Each of the first flip-flops 111-1, 211-1 transmits the data synchronously with first and second clock signals generated in the memory card 200 and the host 300, respectively. The second flip-flops 111-2, 211-2 of the memory card 200 and the host 300, respectively are constructed to receive the data synchronously with an external clock signal generated by other apparatuses.

The host 300 has a function, for instance, of determining whether the data can be transmitted through an inside clock signal (the first clock signal CLK1) generated in the memory card 200. The memory card 200 stores an ID indicating whether the data can be transmitted into a ROM 116. When the host 300 recognizes the ID stored in the ROM 116, an enable command of the function is transmitted to the memory card 200, and the memory card 200 can operate the function in accordance with the transmitted enable command.

Figure 6:
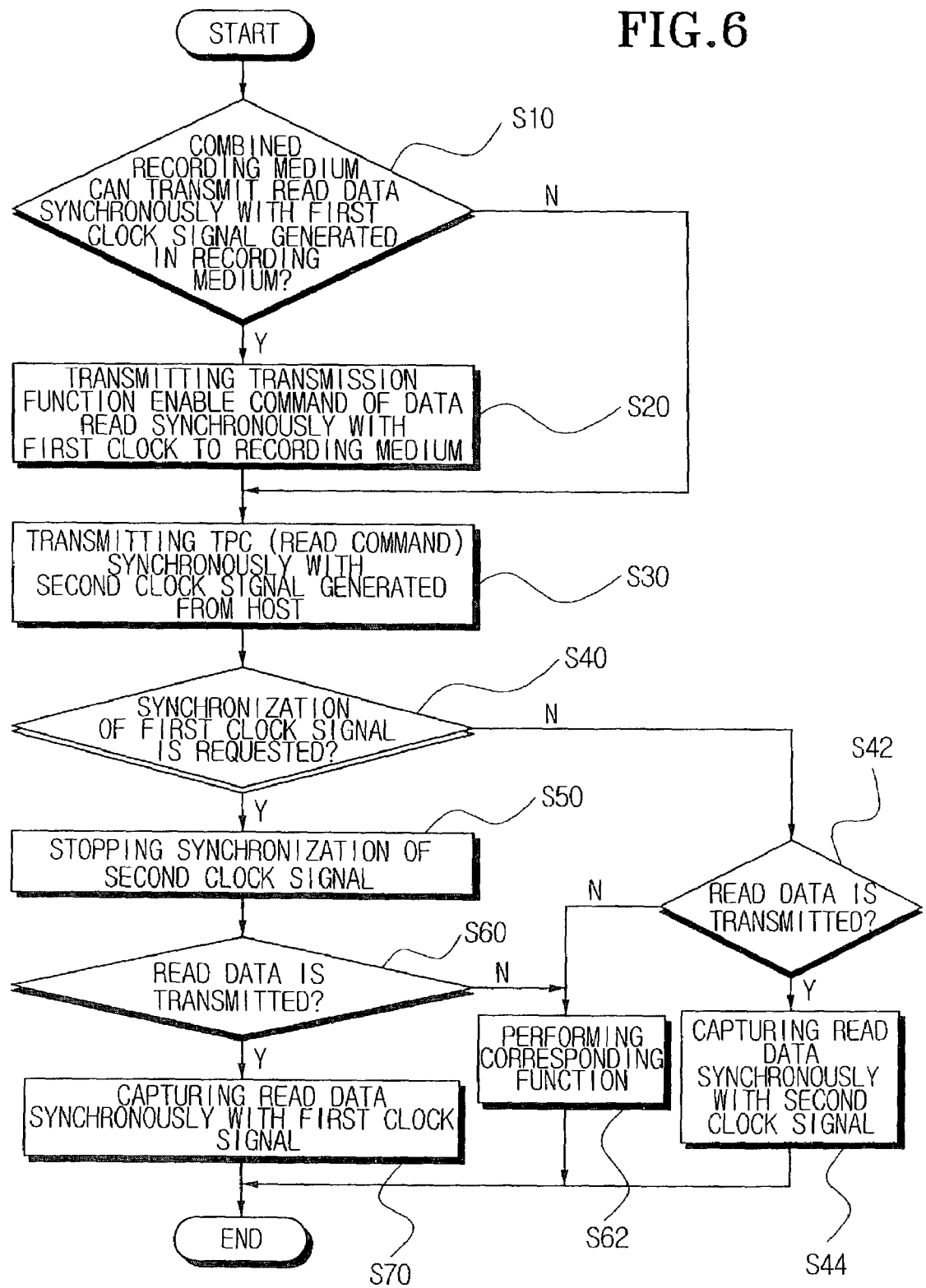
FIG. 6 is a flow chart describing an operation of data reading by a host.

Hereinafter, a method of data interfacing between the memory card 100 and the digital device shown in FIG. 5 will be described referring to FIGS. 6 and 7. FIG. 6 is a flow chart showing an operation of data reading by the host 300. At operation S10, the host 300 determines whether a read data can be synchronously transmitted from the memory card 200 with the inside clock signal (a first clock signal CLK1) to the host 300. The host 300 reads a configuration of the ROM 116 included in the memory card 200. Then, at operation S20, when the host 300 determines that the memory card 200 can synchronously transmit the data with the first clock signal CLK1, the host 300 transmits an enable command of a data transmission function by the inside clock signal (the first clock signal CLK1) to the memory card 200. Subsequently, at operation S30, a TPC (read command for data stored in flash memory) is synchronously transmitted to the memory card 200 with a second clock signal CLK2 generated in the host 300. The above operations are performed in a section of a second state BS1 of the state line as shown in FIGS. 3A to 3C.

When the TPC transmission in regard to the memory card 200 is completed, a state line BS becomes a third state BS2. While a busy signal is transmitted from the memory card 200 through the data line 152 in the third state BS2, the host 300 is on a stand-by state. A section of the third state BS2 is a section that the data is transmitted to the page buffer 113 from the flash memory 110 of the memory card 200. Subsequently, a special signal is transmitted after all data is transmitted from the flash memory 110 to the page buffer 113. Specifically, at operation S40, a determination is made as to whether a synchronization request signal of the first clock signal CLK 1 is transmitted from the memory card 200.

At operation S50, the host 300 stops the synchronization of the first and the second flip-flops 211-1, 211-2 of the host 300 using the second clock signal CLK2. In other words, the host 300 converts the state line BS into a fourth state BS3, and also converts the first tri-state buffer 211-3 of the host 300 into a high impedance state. The first and the second flip-flops 211-1, 211-2 of the host 300 are operated synchronously with the first clock signal CLK1 transmitted from the memory card 200. At operation S60, a determination is made as to whether the read data is transmitted from the memory card 200 together with the first clock signal CLK1. At operation S70, the second flip-flop 211-2 of the host 300 captures the read data synchronously with the first clock signal CLK1.

Further, the host 300 reads the configuration of the combined memory card 200. At operation S62, the host 300 determines that the memory card 200 does not have the function of transmitting the read data synchronously with the inside clock signal (the first clock signal CLK1), and the host 300 transmits the TPC (read command for data stored in flash memory) to the memory card 200 synchronously with the second clock signal CLK2 generated in the host 300. At operation S42, a determination is made as to whether the read data is transmitted from the memory card 200 synchronously with the second clock signal. At operation S44, the host 300 captures the read data transmitted synchronously with the second clock signal (CLK2) from the second flip-flop 211-2 of the host 300. If, at operation S42, the data is not transmitted from the memory card, at operation S62 the data transmission function is performed.

Figure 7:
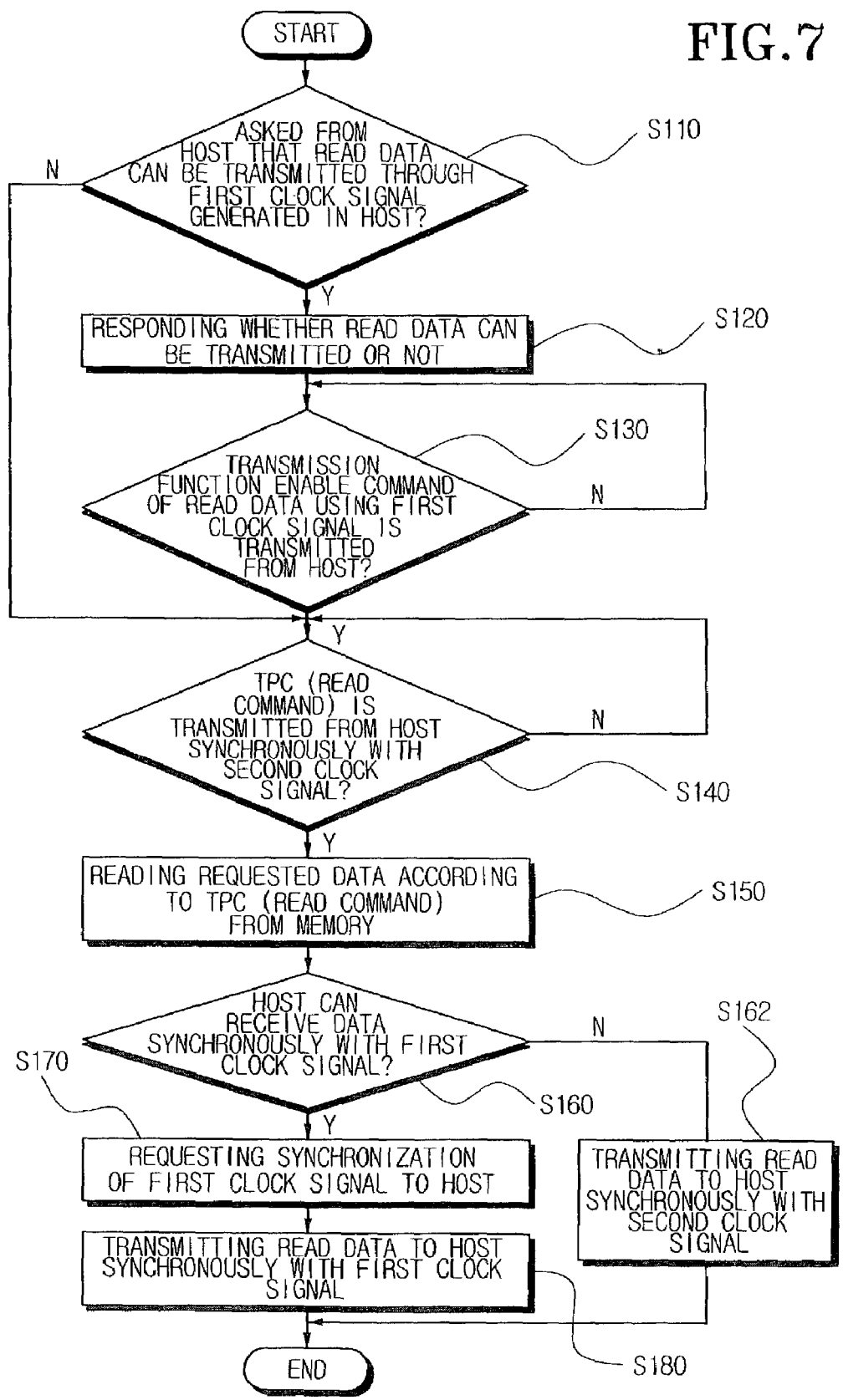
FIG. 7 is a flow chart describing an operation of the memory card of FIG. 5.

FIG. 7 is a flow chart showing an operation of the memory card 200 shown in FIG. 5. At operation S110, a determination is made as to whether the read data can be transmitted through the first clock signal CLK1 generated in the memory card 200 from the host 300. At operation S120, the memory card 200 responds as to whether the read data can be transmitted. Further, the configuration data stored in the ROM 116 is transmitted to the host 300. At operation S130 the host 300 determines whether the configuration data has the ID with regard to the function of transmitting the data synchronously with the first clock signal CLK1.

At operation S140, the host 300 transmits the enable command of the function of transmitting the read data using the first clock signal CLK1 and a determination is made as to whether the host 300 synchronously transmits the TPC (data read command) with the second clock signal CLK2. At operation Si 50, the data requested in accordance with the TPC is read from the memory 110. The NAND-type flash memory is used for the memory 110, thus the read data is transmitted to the page buffer 113 for a high speed. When the transmission of the read data to the page buffer 113 is completed, at operation S160, the host 300 determines whether the data can be transmitted synchronously with the first clock signal CLK1.

When the enable command is transmitted from the host 300 at operation S162, the memory card 200 determines that the host 300 can receive the data synchronously with the first clock signal CLK1, and transmits the special signal to the host 300. At operation S170, a first clock signal CLK1 synchronization request signal is transmitted to the host 300. At operation S180, the read data is transmitted to the host 300 synchronously with the first clock signal CLK1 through the first flip-flop 111-1. When the data transmission is completed, the first tri-state buffer 111-3 becomes high impedance, and the output of the first clock CLK1 is stopped. When the host 300 cannot receive the data synchronously with the inside clock signal (first clock) of the memory card 200, that is, when there is no enable command, the first flip-flop 111-1 is operated to synchronously transmit the data with the second clock signal CLK2. The first tri-state buffer 111-3 becomes high impedance and the first clock signal CLK1 is not allowed to be operated.

Meanwhile, when the data is recorded into the memory card 200 from the host 300, the clock signal input to the first flip-flops 111-1, 211-1 of the memory card 200 and the host 300 is provided from the host 300 because a direction of the data transmission is from the host 300 to the memory card 200. When the data is transmitted from the host 300 to the memory card 200, a clock frequency of the host 300 is increased so that the data can be transmitted.

According to the memory card 200 and the digital device and the method of the data interfacing between the memory card 200 and the digital device of the present invention, a skew problem between the data and the clock can be solved because the clock signal is provided from a side that transmits the data between the digital device and the memory card 200. Moreover, a timing margin is also solved, thus the capturing operation can be stabilized. Accordingly, some hindering elements for improving the data transmission speed between the digital device and the memory card 200 are eliminated, thus the data transmission speed can be improved by increasing the clock frequency. In addition, as the data transmission speed is improved, a storage application range of a moving image and multi-media can be also extended. For example, in the case of the digital camera, the speed of consecutive photographing is increased.

Although the preferred embodiment of the present invention has been described, it will be understood by those skilled in the art that the present invention should not be limited to the described preferred embodiment, but various changes and modifications can be made within the spirit and the scope of the present invention. Accordingly, the scope of the present invention is not limited within the described range but the following claims.

What is claimed is:

1. A memory card, comprising:
   a memory unit storing data;
   an oscillator generating a first clock signal; and an interface transmitting the data synchronously read with the first clock signal to a host connected therewith, and receiving from the host recording data synchronously transmitted from the host with a second clock signal generated by the host;

wherein the interface comprises a memory having information with regard to an existence of a function to transmit the data synchronously read with the first clock signal from the memory unit, and enables the function when an enable command is transmitted from the host, wherein the enable command is generated when the function is determined to be stored in the memory.

2. The memory card according to claim 1, wherein the memory unit is a NAND-type flash memory.

3. The memory card according to claim 1, wherein the interface comprises:
 a first flip-flop outputting the data which is synchronously read with the first clock signal; and
 a second flip-flop receiving from the host the recording data synchronously transmitted with the second clock signal.

4. The memory card according to claim 3, wherein the interface further comprises:
 a clock line, commonly connected to each clock terminal of the first and the second flip-flops, receiving the second clock signal; and
 a first switching unit switching the first clock signal to the clock line according to an input/output of the data.

5. The memory card according to claim 4, wherein the interface further comprises:
 a single data line, commonly connected to an output terminal of the first flip-flop and an input terminal of the second flip-flop, to interface the data with the host; and
 a second switching unit disposed between the output terminal of the first flip-flop and the data line, preventing the data transmitted from the interface from being input to the host.

6. The memory card according to claim 5, wherein each of the first and the second switching units is a tri-state buffer.

7. A digital device used with a memory card, comprising:
 an interface receiving read data synchronously transmitted from the memory card with a first clock signal generated from the memory card; and
 an oscillator generating a second clock signal, wherein the interface synchronously transmits recording data to the memory card with the second clock signal generated by the oscillator;
 wherein the interface comprises a first flip-flop receiving the read data synchronously transmitted with the first clock signal, a second flip-flop synchronously transmitting the recording data with the second clock signal to the memory card, a clock line, commonly connected with each clock terminal of the first and the second flip-flops, receiving the second clock signal, and a first switching unit switching the first clock signal to the clock line according to an input/output of the data.

8. The digital device according to claim 7, further comprising:
 a control unit transmitting an enable command to activate a function of transmitting the read data to the memory card, wherein the control unit detects that the function is stored in the memory card.

9. The digital device according to claim 7, wherein the interface further comprises:
 a single data line, commonly connected with an output terminal of the first flip-flop and an input terminal of the second flip-flop, interfacing the data with a host; and
 a second switching unit disposed between the output terminal of the first flip-flop and the data line, preventing the recording data from being input.

10. The digital device according to claim 9, wherein each of the first and the second switching units is tri-state buffer.

11. A method of data interfacing between a memory card and a digital device, comprising:
 synchronously transmitting a data read command with a second clock signal from a host to the memory card;
 synchronously receiving the data read command with the second clock signal;
 reading a data stored in the memory card according to the data read command transmitted;
 transmitting the data synchronously read with a first clock signal from the memory card to the host;
 receiving the synchronously read data transmitted from the memory card by the host;
 detecting an existence of a function in the memory card to transmit the data synchronously read with the first clock signal; and
 transmitting an enable command to the memory card when the function is detected to exist in the memory card prior to transmitting the data read command from the host to the memory card.

12. A method of data interfacing between a memory card and a digital device, comprising:
 synchronously transmitting a data read command with a second clock signal from a host to the memory card;
 synchronously receiving the data read command with the second clock signal;
 reading a data stored in the memory card according to the data read command transmitted;
 transmitting the data synchronously read with a first clock signal from the memory card to the host;
 receiving the synchronously read data transmitted from the memory card by the host;
 transmitting a signal from the host to the memory card to request synchronization with the first clock signal prior to transmitting the data synchronously read with the first clock signal; and
 stopping the synchronization of the data read command with the second clock signal when the host receives the signal to request the synchronization with the first clock signal and prior to receiving the data synchronously transmitted with the first clock signal.

* * * * *

UNITED STATES PATENT AND TRADEMARK OFFICE
CERTIFICATE OF CORRECTION

| | | |
|---|---|---|
| PATENT NO. | : 6,971,582 B2 | Page 1 of 1 |
| APPLICATION NO. | : 10/191437 | |
| DATED | : December 6, 2005 | |
| INVENTOR(S) | : Jin-soo Kim | |

It is certified that error appears in the above-identified patent and that said Letters Patent is hereby corrected as shown below:

On the cover page, (56) References Cited, U.S. Patent Documents, column 2, line 11, change "Inkai" to --Inukai--

Signed and Sealed this

Third Day of October, 2006

JON W. DUDAS
*Director of the United States Patent and Trademark Office*